United States Patent Office 3,345,116
Patented Oct. 3, 1967

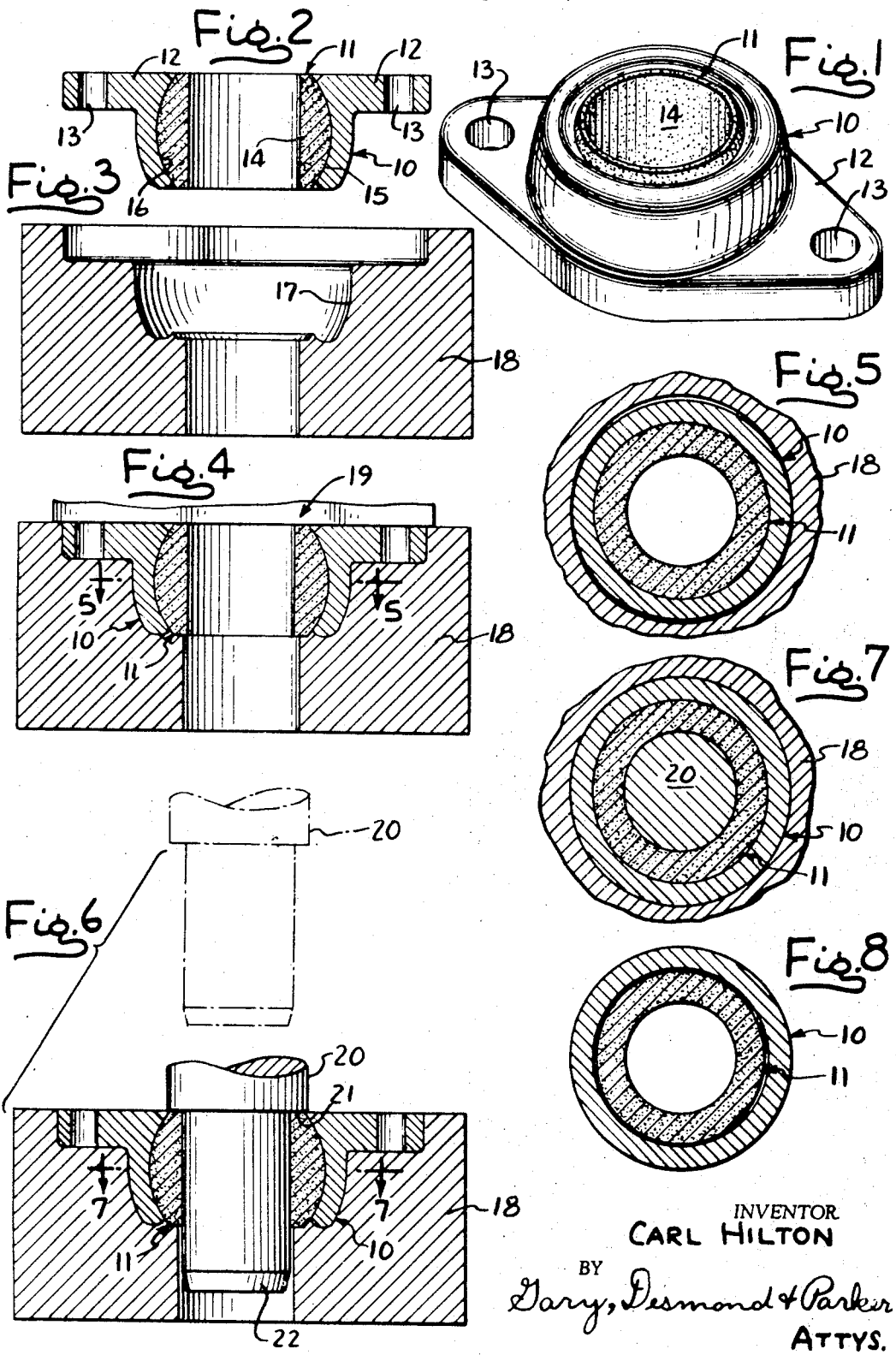

3,345,116
PILLOW BLOCK
Carl Hilton, Chicago, Ill., assignor to Masten Corporation, Chicago, Ill., a corporation of Illinois
Original application Apr. 16, 1962, Ser. No. 187,872, now Patent No. 3,192,607, dated July 6, 1965. Divided and this application June 1, 1965, Ser. No. 460,196
1 Claim. (Cl. 308—72)

ABSTRACT OF THE DISCLOSURE

A pillow block comprising a one-piece rigid housing formed with a spherical bore, and a bearing composed of elastic sintered powdered metal material formed with a cylindrical axial bore and a substantially spherical outer surface snugly pivotally disposed in and embraced by the defines of said substantially spherical bore, the outer surface of said bearing only being slightly out-of-round and retained in said housing against rotation on its axis.

---

This application is a division of Ser. No. 187,872, filed Apr. 16, 1962, now Patent No. 3,192,607 issued July 6, 1965.

This invention relates to the production of a novel pillow block.

More particularly the present invention relates to a new and improved self-aligning pillow block and to the method of making same.

It is a particular object of the present invention to provide a novel one-piece pillow block wherein the bearing is non-rotatably but pivotally retained therein whereby self-aligning bearings are provided for journaling the ends of a rotatable shaft.

It is a further object of the present invention to provide a method and means for casting a one-piece metal housing about a pre-formed bearing composed of elastic material and whereby after casting the bearing readily separates from the housing to the extent that it can be pivoted within but not disengaged from the housing.

In general, the unit of the present invention comprises an inner bearing member of elastic material such as sintered powdered metal having a spherical outer diameter and a cylindrical inner diameter or bore. The spherical outside diameter of the bearing is substantially enclosed by a rigid one-piece metal housing cast thereabout. The spherical outer diameter of the bearing permits it to pivot within the rigid housing to allow for alignment of a shaft journaled in the bearing.

Large scale commercial production of a unit of the foregoing type has been restricted at the present time, the basic problem therein being casting of a movable spherical insert into a rigid housing and to compensate for the contraction of the housing on cooling. Without some means of compensating for this contraction, the insert is locked in place and as a result cannot be pivoted. One method for compensating for this contraction is to coat the insert with some material, such as a lubricant, which will be dissipated either in the casting process or afterward. The prime reason for making the latter impractical for consistent large scale commercial production is that of maintaining a uniform coating on the insert and controlling the dissipation of the coating. Another disadvantage of the aforesaid method is that when sufficient coating is obtained for subsequent pivoting of the insert, some means must be introduced to keep the insert from spinning on its axis.

The difficulties of the prior practices are overcome by the present invention which employs a pre-formed bearing composed of elastic material such as the aforesaid porous sintered powdered metal composition. Such porous sintered powdered metal material is elastic within limits and has properties of expansion and contraction and a high degree of elasticity, and these properties are taken advantage of in the present invention.

Other objects and advantages of the present invention together with its details of construction, arrangement of parts and economies thereof will be apparent from a consideration of the following specification and accompanying drawings, wherein:

FIG. 1 is a perspective view of a unitary pillow block formed in accordance with the present invention, and wherein a bearing of the character aforesaid is pivotally disposed and retained within a one-piece metal housing cast thereabout, the housing being of the two-bolt flange mounting type.

FIG. 2 is a section through a one-piece metal housing cast around and in firm embracing engagement with a sintered powdered metal bearing.

FIG. 3 is a sectional view of a die component for compressing the unitary assembly of FIG. 2.

FIG. 4 is a section through the die of FIG. 3 showing the unit of FIG. 2 compressed therein by means of a ram.

FIG. 5 is a section on the line 5—5 of FIG. 4.

FIG. 6 is a view showing the movement of a shouldered ram into the cavity of the die and contained pillow block assembly of FIG. 4.

FIG. 7 is a section on the line 7—7 of FIG. 6.

FIG. 8 is a section similar to that of FIG. 7 but with the pillow block removed from the ram and die components of FIG. 6.

Referring to the drawings, the reference numeral 10 generally indicates a one-piece metal housing, for example, aluminum, cast about the bearing generally indicated at 11. The housing is formed with a pair of flanges 12, 12 each having a hole 13 for reception of a mounting bolt. It will, of course, be understood that the illustrated pillow block unit is for the purpose of illustration and not limitation. Thus, for example, the housing may have a three-bolt flange mounting, and in lieu of the axis of the bearing 11 being parallel to the axes of the bolt holes 13, 13, it will be understood that the unit may be in the form of the standard mounting wherein the axes of the bolt holes 13, 13 are perpendicular to the axis of the bearing 11. Of course, the flanges 12, 12 will then be at an angle of 90° to that shown in the illustration of FIG. 1. Alternatively the housing may be formed without attachment flanges so that the outer surface of the portion which embraces bearing 11 is cylindrical and is later pressed into a cylindrical holder by the user.

The bearing 11 as employed in the present invention, is pre-formed of conventional powdered metals, typical compositions of which are 90% copper and 10% tin; 77.5% copper, 7.5% tin and 15% lead; 25% copper and 75% iron; 20% copper, 79.5% iron, and 0.5% carbon, and the like. A further alternative can be straight iron. These compositions are given for the purpose of illustration and not limitation. The bearings are composed of compressed powders which are sintered in conventional manner to result in compositions having a resilient sponge-like character. These are conventionally employed for self-lubricating bearings in that they are porous and can contain approximately 25% of lubricating oil by volume stored in the tiny interconnected pores of the pre-formed bearing, this type being known as an "Oilite" bearing.

As shown in FIG. 2, the bearing 11 is formed initially with a cylindrical bore 14 and a spherical outer surface 15. In casting the housing 10 about the bearing 11 in a suitable mold or die, not shown, the bearing 11 is first seated on a core pin and a one-piece housing 10 cast thereabout.

As a result, the housing 10 is formed with a mating spherical surface bore 16. Desirably also and for facility in subsequent pivoting as will be explained, the altitude of the spherical seat 16 of the housing 10 is less than that of the spherical segment surface 15 of the bearing 11.

The housing material metal as it cools, shrinks tightly around the bearing 11. It will be understood that no coating has been employed between the outer surface of the bearing 11 and the cast face of the housing 10 and the bearing 11 as employed in the practice of the present invention is dry during casting, and subsequently impregnated with oil.

The assembly of the housing and bearing as shown in FIG. 2 is then, in accordance with the present invention, radially compressed after casting, by applying pressure to the outside of the housing 10, particularly the portion thereof which embraces the bearing 11, and by also applying pressure to the end of the bearing 11 in an axial direction and in a further radial direction from inside the bore 14 of the bearing 11.

Thus, the unit as shown in FIG. 2 is forced into the cavity 17 of the die 18 by means of a ram 19, the cavity of the die 18 being slightly smaller than the outer dimensions of the housing 10. The reduction in size of the housing 10 as a result of the aforesaid compression, is such as to maintain the metal of the housing 10 within its elastic limits so that no permanent set is retained after removing the housing 10 from the die 18.

A shouldered punch 20 is then inserted into the bore 14 of the bearing 11 until the shoulder 21 thereof contacts an end of the bearing 11. The punch which is endwise tapered as at 22 has a diameter slightly larger than that of the bore 14 so that it results in radial compression in an outward direction and opposite to the radial compression resulting from forcing the housing 10 into the die 18.

The shouldered punch 20 is slightly out-of-round so that when forced into the bearing 11 it induces in the latter a slightly out-of-round shape which is retained therein due to compression of the bearing 11 beyond its elastic limit.

Thus, when the punch 20 is removed from the bearing 11, and the housing 10 is removed from the die 18, the housing 10 will return to its original size and contour but the bearing 11 will retain about 20% of its compression and slightly out-of-round condition. This set compression in the bearing, as a result of its resilient character, causes it to thereby separate from the confines of the spherical bore 14 of the housing 10 but to be retained therein in a pivotal manner. Further due to the resulting out-of-round character of the bearing 11, it is prevented thereby from spinning within the housing 10. At the same time, the strain of shrinkage of the housing 10 is relieved.

In a modified practice, the precast assembly of the housing 10 about the bearing 11 is forced into the cavity 17 of the die 18 in the manner previously described. However, in this case the cavity 17 of the die is slightly out-of-round so that the housing 10 becomes temporarily pressed to out-of-round condition. Thereafter, a shouldered punch similar to that of punch 20 is forced into the now slightly deformed bore 14 of bearing 11. However, in this case the punch 20 is cylindrical in cross section, except for a slight taper. The diameter of the punch 20 is of course slightly greater than that of the bore 14 in this modification so that the outer surface of bearing 11 becomes deformed to an out-of-round condition since it is restricted by the out-of-round compressed housing from expanding equally. The sintered powdered metal composition of the bearing 11 while being resilient and returning to some of its original form, nevertheless does not return to its completely original form but remains with its outer surface deformed and out-of-round. Thus, while it becomes in this operation separated from the housing 10, it is nevertheless retained therein in a pivotal manner, firstly by the housing 10, and secondly is retained against spinning on its axis by reason of its out-of-round character and relatively small degree of separation from the confines of the housing 10.

In another modified method, similar but not fully equivalent results may be accomplished with or without restraining the housing 10. In this case, the die 18 having a cavity 17 may be employed but wherein the cavity 17 is of equal dimension to the outer diameter of the housing 10 so that it merely forms a seat therefor. In the alternative, other holding means may be employed. In this modified method, the sintered powdered metal bearing 11 only is compressed by restraining its axial movement at one end by means of, for example, the die 18, or other means, and a shouldered punch similar to punch 20 of slightly larger diameter than the inside diameter of the bore 14 is forced into the bearing 11. This compresses the bearing to a degree beyond its elastic limit and when the punch is withdrawn the bearing will spring back sufficiently to relieve the restraining force of the compression of the housing 10 and separate itself from the housing. In this case, the housing and bearing remain round, but the amount of expansion and spring-back is controlled to retain sufficient friction of the bearing 14 against the confines of housing 10 so as to prevent the bearing 11 from spinning on its axis while remaining pivotally retained in the housing 10.

However, due to the pivotability of the bearing 11 within the housing 10 in each case, it is possible to compensate for initial or subsequent minor misalignment of a shaft journaled in the bearing 11 and to thereby relieve undue stress on either the bearing or the shaft or both. The housing 10 needs only to be bolted in place by means of suitable bolts engaged through the holes 13 in the integral flanges 12 to provide a bearing surface for a rotatable shaft. Thus, the device of the present invention provides a self-aligning bearing surface with a simple means by fastening the bearing to a suitable support and eliminates the need for costly alignment since the unique construction and arrangement of the parts automatically provides for self-alignment and the assembly relieves undue stress of the engaged rotating shaft in the bearing through application of a ball-joint-like unit.

Although I have shown and described the preferred embodiment of my self-aligning pillow block and preferred method and means for forming the same, it will be understood by those skilled in the art that various changes may be made in the details thereof without departing from the spirit and scope of my invention as comprehended by the following claim.

I claim:

A self-aligning pillow block comprising a one-piece rigid cast metal bearing block formed with a spherical bore, and a bearing composed of porous sintered powdered metal formed with a cylindrical axial bore and a substantially spherical outer surface of greater segment than that of said spherical bore snugly and pivotally disposed in and embraced by the defines of said spherical bore, said bearing being out-of-round as viewed in transverse cross-section so as to be of ellipsoidal shape, the diametrically opposed radially outermost portions of the ellipsoidally shaped bearing being in frictional engagement with the inner surface of the spherical bore of the bearing block, whereby to retain the bearing against spinning on its axis.

References Cited

UNITED STATES PATENTS

| | | | |
|---|---|---|---|
| 1,656,508 | 1/1928 | Claus | 308—72 |
| 1,664,189 | 3/1928 | Claus | 308—72 |
| 2,149,983 | 3/1939 | Smith | 308—72 |
| 2,322,004 | 6/1943 | Fast | 308—72 X |
| 2,596,202 | 5/1952 | Bolte | 308—72 |
| 3,141,231 | 7/1964 | Davies et al. | 308—72 X |

FOREIGN PATENTS 911,204  3/1946  France.

MARTIN P. SCHWADRON, *Primary Examiner.*

R. F. HESS, *Assistant Examiner.*